United States Patent
van der Zalm (10) Patent No.: US 10,486,410 B2
(45) Date of Patent: Nov. 26, 2019

(54) PRINT BED LEVELLING SYSTEM AND METHOD FOR ADDITIVE MANUFACTURING

(71) Applicant: Ultimaker B.V., Geldermalsen (NL)

(72) Inventor: Erik van der Zalm, Eindhoven (NL)

(73) Assignee: Ultimaker B.V., Geldermalsen (NL)

( * ) Notice: Subject to any disclaimer, the term of this patent is extended or adjusted under 35 U.S.C. 154(b) by 195 days.

(21) Appl. No.: 15/246,776

(22) Filed: Aug. 25, 2016

(65) Prior Publication Data

US 2017/0057173 A1 Mar. 2, 2017

(30) Foreign Application Priority Data

Aug. 28, 2015 (NL) ...................... 2015361

(51) Int. Cl.
| | | |
|---|---|---|
| *B33Y 10/00* | (2015.01) | |
| *B33Y 30/00* | (2015.01) | |
| *B33Y 50/02* | (2015.01) | |
| *B29C 64/106* | (2017.01) | |
| *B29C 64/112* | (2017.01) | |
| *B29C 64/20* | (2017.01) | |
| *B29C 64/386* | (2017.01) | |

(52) U.S. Cl.
CPC ............ *B33Y 10/00* (2014.12); *B29C 64/106* (2017.08); *B29C 64/112* (2017.08); *B29C 64/20* (2017.08); *B29C 64/386* (2017.08); *B33Y 30/00* (2014.12); *B33Y 50/02* (2014.12)

(58) Field of Classification Search
CPC .......... B29C 64/393; B29C 2049/4231; B29C 64/386
See application file for complete search history.

(56) References Cited

U.S. PATENT DOCUMENTS

| | | | |
|---|---|---|---|
| 2009/0008967 A1* | 1/2009 | Antreich | B60J 7/0573 296/223 |
| 2010/0021580 A1* | 1/2010 | Swanson | B29C 31/042 425/132 |
| 2013/0242317 A1 | 9/2013 | Leavitt et al. | |

(Continued)

FOREIGN PATENT DOCUMENTS

DE 202015000165 U1 4/2015

OTHER PUBLICATIONS

The Xack, "Bed auto leveling (capacitive) + E3D Hotend (RepRap-Pro Mendal)," Jul. 27, 2014, www.youtube.com/watch?v=MjDHaBO7zic (retreived on Jul. 16, 2018). (Year: 2014).*

(Continued)

*Primary Examiner* — Robert A Vetere
(74) *Attorney, Agent, or Firm* — N.V. Nederlandsch Octrooibureau; Catherine A. Shultz; Tamara C. Stegmann (57) ABSTRACT

A print bed levelling system for an additive manufacturing system includes a nozzle head assembly movably arranged with respect to a substantially flat print bed member, wherein the nozzle head assembly comprises one or more nozzle bodies each having a nozzle end and a contactless sensor member disposed at a print bed engagement end of the nozzle head assembly. The contactless sensor member comprises a sensing surface in sensing engagement with the print bed member over a relative sensing distance range between a distal sensing position and a proximal sensing position.

17 Claims, 3 Drawing Sheets

(56) References Cited

U.S. PATENT DOCUMENTS

2013/0345894 A1* 12/2013 Haddad ............. G01N 35/1011
700/302
2017/0211344 A1* 7/2017 Aalderink ............. E21B 19/163

OTHER PUBLICATIONS

XP054976544—The Xack: "Bed auto leveling(capacitive) + E3D Hotend (RepRapPro mendel)",YouTube video,Jul. 28, 2014 (Jul. 28, 2014),Gevonden op het Internet:URL:https://www.youtube.com/watch?v=MjDHaB07zic.

XP054976545—Juan Felipe Luna: "K8200/3Drag Auto-Level Inductive Proximity Sensor Switch Test",YouTube video,Dec. 29, 2014 (Dec. 29, 2014),Gevonden op het Internet: URL:https://www.youtube.com/watch?v=9LUilpISe4M.

XP002757844—"help brainstorm a better bed leveling adjustment mechanisim",Internet, RepRap forum,Jan. 15, 2012 (Jan. 15, 2012),Gevonden op het Internet:URL:http://forums.reprap.org/read.php?151,114105.

Search Report and Written Opinion NL2015361, dated Jun. 29, 2016.

* cited by examiner

PRINT BED LEVELLING SYSTEM AND METHOD FOR ADDITIVE MANUFACTURING

FIELD OF THE INVENTION

The present invention relates to a print bed levelling system, in particular to a print bed levelling system for use in additive manufacturing. In a further aspect the present invention relates to a method of print bed levelling for a print bed levelling system.

BACKGROUND

US patent application US 2013/0242317 A1 (Leavitt et al.) discloses a method for calibrating a print head for use in an additive manufacturing system. The method comprises positioning the print head over a calibration target, where the calibration target has a top surface with a plurality of edges. The method further comprises moving a tip of the print head to identify coordinate locations of the edges, and setting a calibration parameter for the print head. In an embodiment, a linear encoder may be utilized to monitor elevation changes of the print head relative to a head carriage when the print head drops of the top surface of the calibration target.

SUMMARY

The present invention seeks to provide an improved print bed levelling system for use in additive manufacturing, wherein the print bed levelling system allows for accurate position calibration of one or more nozzle bodies relative to a print bed or plates onto which material can be deposited during an additive manufacturing process. The print bed levelling system is robust to various external factors such as temperature changes, humidity levels as well to the collection of dirt and waste material onto components of the print bed levelling system.

According to an embodiment of the present invention, a print bed levelling system of the type defined in the preamble is provided, wherein the print bed levelling system comprises a nozzle head assembly movably arranged with respect to a substantially flat print bed member, the nozzle head assembly comprising one or more nozzle bodies each having a nozzle end, and a contactless sensor member disposed at a print bed engagement end of the nozzle head assembly, wherein the contactless sensor member comprises a sensing surface in sensing engagement with the print bed member over a relative sensing distance range between a distal sensing position and a proximal sensing position, and wherein a primary nozzle of the one or more nozzle bodies is immovable with respect to the sensing surface and one or more secondary nozzles of the one or more nozzle bodies are movable with respect to the primary nozzle.

The print bed levelling device allows cost effective yet accurate and reliable position calibration of one or more nozzle bodies with respect to a print bed member. Various perturbing factors and disturbances such as temperature changes, humidity levels, print bed contamination and the like are minimized through the contactless sensor member.

In an embodiment, the sensing surface of the contactless sensor member is fixedly attached to the print bed engagement end of the nozzle head assembly, so that synchronous displacement is obtained of the contactless sensor member and the nozzle head assembly. Movement of the contactless sensor member immediately corresponds with equal movement of the nozzle head assembly to facilitate position calibration of the one or more nozzle bodies with respect to the print bed member.

In a further embodiment the sensing surface of the contactless sensor member is arranged adjacent to the one or more nozzle ends of the one or more nozzle bodies, so that measurement accuracy of the contactless sensor member is improved.

In a further embodiment, the sensing surface of the contactless sensor member is a flat surface substantially parallel to the print bed member, thereby allowing for a large sensing area that can be in close proximity to the print bed member to also improve measurement accuracy. Further, to ensure that the sensing surface does not come into contact with the print bed member, an embodiment is provided wherein the one or more nozzle bodies, in particular each nozzle end thereof, are positioned closer to the print bed member than the sensing surface.

In an embodiment the one or more nozzle bodies are relatively movable with respect to one another, so that each nozzle body may become (but need not) an active nozzle body during an additive manufacturing process by positioning it accordingly. Remaining nozzle bodies may then be positioned in an inactive position for avoiding interference with the active nozzle as it deposits material during an additive manufacturing process.

In an embodiment, the primary nozzle is fixedly attached to the nozzle head assembly and the secondary nozzle bodies are movably attached to the nozzle head assembly.

The contactless sensor member allows for a variety of different sensing technologies for accurate print bed levelling. For example, in an embodiment the print bed member comprises electrically conductive material and the contactless sensor member comprises a capacitive displacement sensor in capacitive sensing engagement with the print bed member. This embodiment allows not only for accurate measurement but is also very reliable as any the conductive print bed member can be readily detected. Capacitive sensing is very robust to print bed contamination and dimensional offsets, inaccuracies etc., but also changing atmospheric conditions do not have a significant impact on measurement accuracy and reliability. Other advantages of the capacitive displacement sensor is stability and speed of measurement, high measurement resolution and low power usage.

In a further embodiment, the print bed member comprises electrically conductive material and the contactless sensor member comprises an inductive displacement sensor in inductive sensing engagement with the print bed member. The inductive displacement sensor also provides high accuracy and reliably when subject to changing conditions such as temperature and humidity levels. Another advantage of the inductive displacement sensor is that delicate processing circuitry need not be disposed near the inductive displacement sensor within the nozzle head assembly but can be conveniently located elsewhere in the print bed levelling system. Inductive displacement sensors can also be regarded as being maintenance free.

In yet a further embodiment, the contactless sensor member may comprise an echo-sonar displacement sensor or ultrasonic displacement sensor in acoustic sensing engagement with the print bed member. An advantage of the echo-sonar displacement sensor is its resistance to external disturbances such as vibration, infrared and EM radiation as well as ambient noise and the like.

According to a further aspect of the invention a method of the type defined is provided comprising the steps of a)

moving a print bed member and a nozzle head assembly toward one another from a distal sensing distance to a proximal sensing distance between a sensing surface of a contactless sensor member and the print bed member; wherein one of the nozzle ends of one or more nozzle bodies is closest to the print bed member; b) continuously measuring a change in displacement of the sensing surface by the contactless sensor member between the distal and proximal sensing distance; c) comparing the measured change in displacement to an expected change in displacement of the sensing surface; and d) halting movement between the print bed member and the nozzle head assembly upon detection of a difference between the measured change in displacement and the expected change in displacement, and then assigning a zero level distance between the one of the nozzle ends and the print bed member.

An important advantage of the method is that only a relative change in displacement between the print bed member and nozzle head assembly is determined whilst performing the method. As a result, the method step of moving the print bed member and the nozzle head assembly toward one another may comprise moving the print bed member toward the nozzle head assembly whilst keeping the nozzle head assembly stationary, or moving the nozzle head assembly toward the print bed member whilst keeping the print bed member stationary. With any of these embodiments accurate print bed levelling can be obtained.

SHORT DESCRIPTION OF DRAWINGS

The present invention will be discussed in more detail hereinafter based on a number of exemplary embodiments with reference to the drawings, in which.

DETAILED DESCRIPTION OF EXEMPLARY EMBODIMENTS

Figure 1:
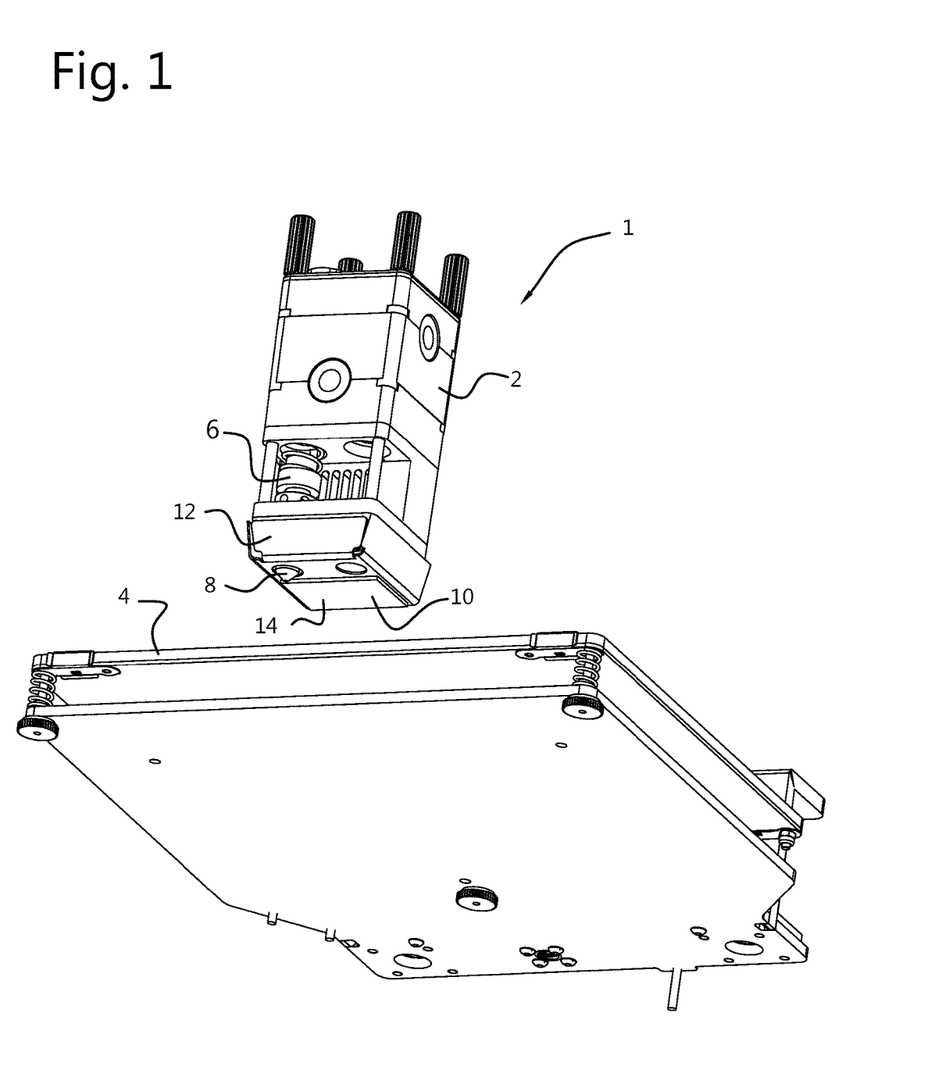
FIG. 1 shows a three dimensional view of a print bed levelling system according to the present invention.
Figure 2:
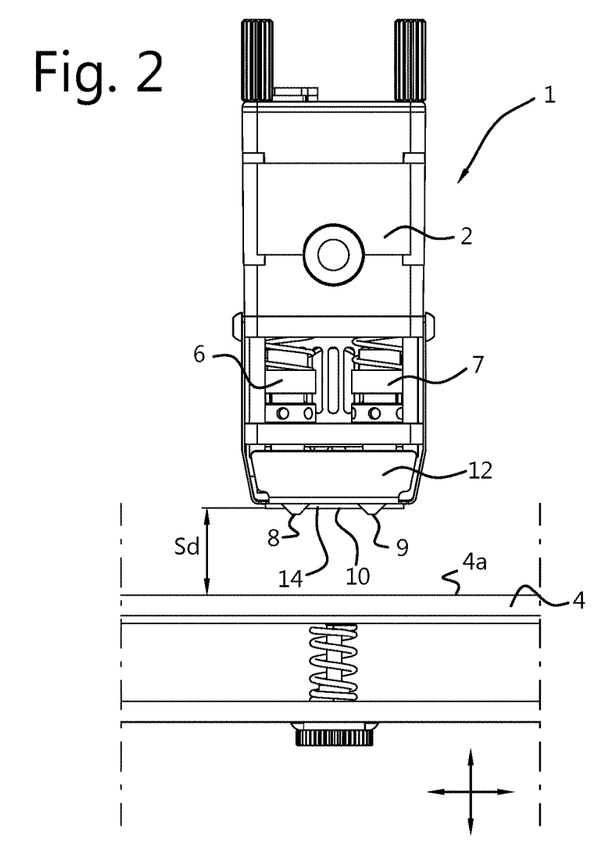
FIG. 2 shows a side view of an embodiment of a nozzle head assembly at a distal position to a print bed member according to the present invention.

FIGS. 1 and 2 show a three dimensional view and side view, respectively, of a print bed levelling system according to the present invention. In the embodiments shown, the print bed levelling system 1 comprises a nozzle head assembly 2 movably arranged with respect to a substantially flat print bed member 4. The nozzle head assembly 2 comprising one or more nozzle bodies 6, 7 each having a nozzle end 8, 9. The nozzle end 8, 9 of each nozzle body 6, 7 is arranged to deposit material for e.g. additively building a three dimensional object, which object is deposited and built on the print bed member 4 and an upper surface 4a thereof. In a typical embodiment, the print bed levelling system utilizes an extrudable material for building an object whereas in other embodiments printable ink may be deposited by each of the nozzle bodies 6,7. Hence, the present invention is not limited to what material is being deposited.

The nozzle head assembly 2 is further provided with a contactless sensor member 10 disposed at a print bed engagement end 12 of the nozzle head assembly 2. The contactless sensor member 10 comprises a sensing surface 14 which is in sensing engagement with the print bed member 4 over a relative sensing distance range between a distal sensing position and a proximal sensing position.

In the distal sensing position the nozzle head assembly 2 is positioned further away from the print bed member 4 and upper surface 4a thereof than in the proximal sensing position wherein the nozzle head assembly 2 is positioned closer to the print bed member 4 and upper surface 4a thereof. In FIG. 2 the nozzle head assembly 2 is depicted in the distal sensing position Sd with respect to the upper surface 4a of the print bed member 4 and.

In an embodiment, the print bed member 4 is movably arranged in horizontal and/or vertical direction relative to the nozzle head assembly 2 as indicated by arrows in FIG. 2. Furthermore, in another embodiment the nozzle head assembly 2 may be movably arranged in horizontal and/or vertical directions relative to the print bed member 4 as indicated by arrows in FIG. 2.

In an embodiment, the sensing surface 14 of the contactless sensor member 10 is fixedly attached to the print bed engagement end 12 of the nozzle head assembly 2, thereby allowing synchronous displacement of the contactless sensor member 10 and the nozzle head assembly 2, which, in turn, allows accurate determination of positional changes of the nozzle head assembly 2 with respect to the print bed member 4 based on measurements taken by the contactless sensor member 10.

Relative displacement of the nozzle head assembly 2 with respect to the print bed member 4 and upper surface 4a, or vice versa, therefore equals a relative displacement of the contactless sensor member 10 and sensing surface 14 with respect to the print bed member 4 and upper surface 4a. This also holds for a nozzle end 8, 9 of one of the one or more nozzle bodies 6, 7 when held stationary with respect to the nozzle head assembly 2. That is, a displacement of the nozzle head assembly 2 relative to the print bed member 4 results in an equal displacement of the nozzle end 8, 9 relative to the print bed member 4 and upper surface 4a thereof, which, in turn, equals a relative displacement of the contactless sensor member 10.

In a further embodiment, the sensing surface 14 of the contactless sensor member 10 is arranged adjacent to the one or more nozzle ends 8, 9 of the one or more nozzle bodies 6, 7. This allows the contactless sensor member 10 and sensing surface 14 to take accurate measurements as the sensing surface 14 can be positioned as close as possible to the print bed member 4 and upper surface 4a thereof, minimizing possible influences of measurement disturbances and perturbing factors between the sensing surface 14 and the upper surface 4a of the print bed member 4.

In an embodiment, as shown in FIG. 1, the sensing surface 14 of the contactless sensor member 10 is a flat surface substantially parallel to the print bed member 4 and the upper surface 4a thereof. Having a substantially flat sensing surface 14 allows for a larger sensing surface 14 that increases measurement resolution and accuracy. In an exemplary embodiment, the flat sensing surface 14 comprises a surface area of at least 0.5 cm$^2$, e.g. 1 cm$^2$, allowing for a measurement resolution of the contactless sensor member 10 of less than 5 μm, i.e. measurements are accurate within 5 μm.

As depicted in FIG. 2, in an embodiment the one or more nozzle ends 8, 9 of the one or more nozzle bodies 6, 7 are positioned closer to the print bed member 4 than the sensing surface 14. In this embodiment the nozzle end 8,9 of the one or more nozzle bodies 6,7 extend beyond the sensing surface 14 in proximal direction to the print bed member 4 and upper surface 4a thereof. This allows the contactless sensor member 10 to remain contactless or non-contacting in case a nozzle end 8,9 of the one or more nozzle bodies 6, 7, contacts the print bed member 4. Furthermore, the sensing surface 14 is also prevented from being damaged should a nozzle end 8, 9 come into contact with print bed member 4.

In an embodiment, the one or more nozzle bodies 6,7 are relatively movable with respect to one another, so that, for example, an active nozzle of the one or more nozzle bodies 6,7 can be positioned for depositing material while inactive nozzles, if any, can be positioned at a suitable position further away from the print bed member 4 relative the active nozzle to avoid interference therewith. Alternatively, each of the one or more nozzle bodies 6, 7 is moveable with respect to the sensing surface 14 of the contactless sensor member 10 between a retracted position and an extended position relative thereto. The retracted position is a position distal to the print bed member 4, or toward the sensing surface 14. The extended position is a position proximal to the print bed member 4, or away from the sensing surface 14. This embodiment is advantageous as an object can be manufactured using two or more nozzle bodies 6, 7 without having idle nozzle bodies interfering with an active nozzle body. That is, an active nozzle body may be in the extended position relative to the sensing surface 14 whilst depositing material, whereas one or more non-active nozzle bodies may be in the retracted position relative to the sensing surface 14. Another advantage is that a position of a nozzle end 8, 9 of one of the one or more nozzle bodies 6, 7 may be calibrated with respect to the print bed member 4 and upper surface 4a thereof in the extended position whilst remaining nozzle bodies are in the retracted position. Due to the extended position of the one nozzle body and nozzle end thereof allows distance measurements and calibration by the contactless sensor member 10 to be uniquely associated with the currently extended nozzle body and nozzle end. In an even further embodiment, a primary nozzle of the one or more nozzle bodies 6,7 may be fixedly arranged with respect to the sensing surface 14 of the contactless sensor member 10, and one or more secondary nozzles of the one or more nozzle bodies 6,7 may be movable with respect to the primary nozzle. This embodiment may be advantageous for position calibration of the one or more secondary nozzles with respect to the primary nozzle, guaranteeing, for example, accurate positioning of each nozzle end of the one or more secondary nozzles with respect to the nozzle end of the primary nozzle.

Figure 3:
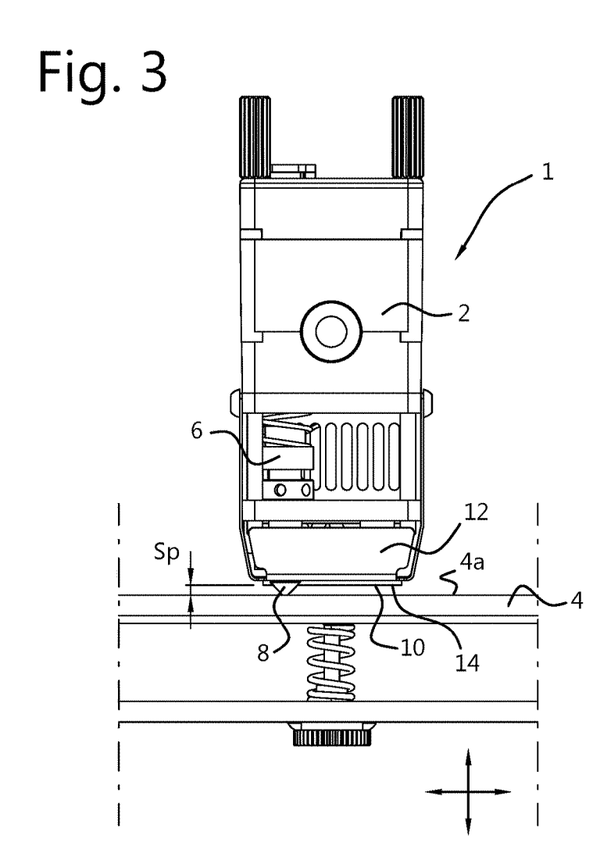
FIG. 3 shows a side view of an embodiment of a nozzle end of a nozzle body in contact engagement with a print bed member according to the present invention.

FIG. 3 shows a side view of an embodiment of a nozzle end of a nozzle body in contact engagement with a print bed member according to the present invention. In this particular embodiment, the nozzle head assembly 2 is proximal to the print bed member 4 and upper surface 4a thereof, wherein a nozzle body 6 and nozzle end 8 are in a levelling configuration or a calibration configuration. In the levelling configuration the nozzle end 8 of the nozzle body 6 is in contact engagement with the print bed member 4, and so the nozzle end 8 cannot be positioned any closer to the print bed member 4. In the levelling configuration the contactless sensor member 10, in particular the sensing surface 14, is at the proximal sensing distance Sp, which may be envisaged as a shortest distance between the sensing surface 14 and the upper surface 4a of the print bed member 4. In a typical embodiment the proximal sensing distance Sp is bigger than zero, leaving a gap between the sensing surface 14 and the upper surface 4 in the levelling configuration.

The levelling configuration corresponds to a reference configuration wherein a distance measured at the proximal sensing distance Sp by the contactless sensor member 10 can be associated with an actual position configuration of the print bed levelling system 1. That is, the levelling configuration can be associated with a reference point from which the print bed levelling system 1 can accurately derive a position of the nozzle end 8 of the nozzle body 6 moves up and down with respect to the upper surface 4a of the print bed member 4 during an additive manufacturing process.

Figure 4:
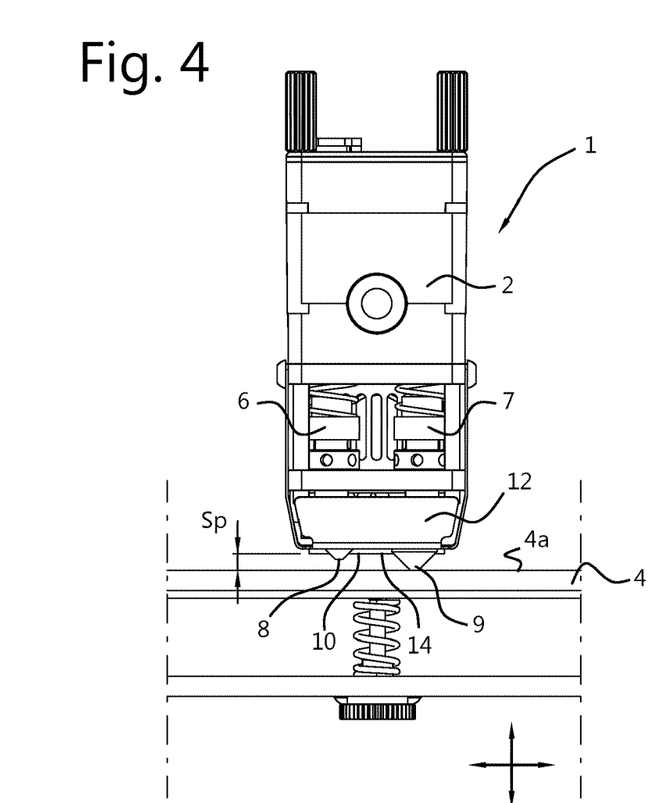
FIGS. 4 and 5 each show a side view of an embodiment of two nozzle bodies of which one nozzle end is in contact engagement with a print bed member according to the present invention.
Figure 5:
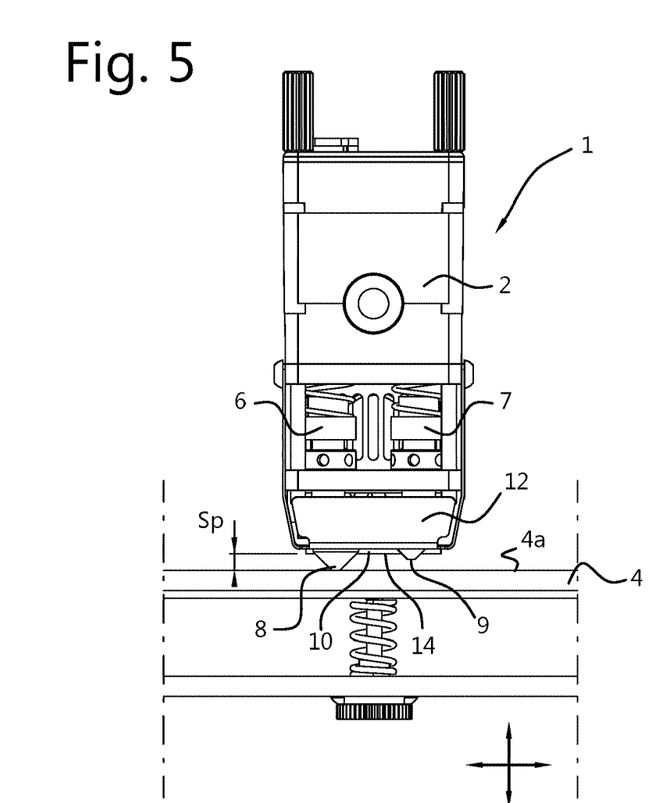

Advantageously, a plurality of levelling configurations can be utilized for a plurality of nozzle bodies 6, 7 as exemplified in FIG. 4 and FIG. 5, each figure showing a side view of an embodiment of two nozzle bodies 6,7 of which just one nozzle end 8, 9 is in contact engagement with a print bed member 4 according to the present invention.

In the embodiment shown in FIG. 4, in a first levelling configuration of the print bed levelling system 1 a first nozzle end 8 and a second nozzle end 9 of two nozzle bodies 6, 7 of the one or more nozzle bodies 6, 7 are in the retracted position and the extended position, respectively. In the first levelling configuration the proximal sensing distance Sp between the sensing surface 14 and the upper surface 4a is associated with the second nozzle end 9.

In the embodiment shown in FIG. 5, on the other hand, in a second levelling configuration of the print bed levelling system 1 the first nozzle end 8 and the second nozzle end 9 of two nozzle bodies 6, 7 of the one or more nozzle bodies 6, 7 are in the extended position and the retracted position, respectively. In the second levelling configuration the proximal sensing distance Sp between the sensing surface 14 and the upper surface 4a is associated with the first nozzle end 8.

In an advantageous embodiment, the print bed member 4 comprises electrically conductive material and the contactless sensor member 10 comprises a capacitive displacement sensor in capacitive sensing engagement with the print bed member 4. The capacitive displacement sensor is cost effective yet highly accurate in determining changes in distance between the sensing surface 14 and upper surface 4a of the print bed member 4, such as measuring the relative sensing distance range between the distal sensing position Sd and the proximal sensing distance Sp of the sensing surface 14 with respect to the print bed member 4 and upper surface 4a. The capacitive displacement sensor is also very robust to various external disturbances such as temperature changes, humidity levels, thin films of waste deposited material on the upper surface 4a of the print bed member 4 etc.

In a further embodiment, the print bed member 4 comprises electrically conductive material and the contactless sensor member 10 comprises an inductive displacement sensor in inductive sensing engagement with the print bed member 4. Inductive sensing is also cost effective, accurate, and robust to external disturbances as with capacitive sensing.

In yet a further embodiment, the contactless sensor member 10 comprises an optical displacement sensor in optical sensing engagement with the print bed member 4. This particular embodiment also allows for accurate distance measurement by the contactless sensor member 10, wherein the print bed member 4 need not comprise an electrically conductive material and can be made of any desired material suitable for optical sensing.

In yet a further embodiment, the contactless sensor member 10 comprises an echo-sonar displacement sensor or ultrasonic displacement sensor in acoustic sensing engagement with the print bed member 4. As with aforementioned embodiments of the contactless sensor member 10, this embodiment allows for displacement sensing of a relatively small, point-like upper surface area of the print bed member 4. However, an echo-sonar displacement sensor may also be readily adapted to allow for displacement sensing of larger surfaces areas of the print bed member 4 at once, e.g. an entire usable upper surface 4a of the print bed member 4.

The echo-sonar displacement sensor utilizes acoustic waves reflecting off the upper surface 4a of the print bed member 4. An advantage of the echo-sonar displacement sensor is that it does not need a particular print bed material or color to accurately measure displacements. Also, the echo-sonar displacement sensor exhibits high resistance to external disturbances such as vibration, infrared and EM radiation, and ambient noise.

In a further aspect the present invention relates to a method of print bed levelling for a print bed levelling system. Reference is made to all FIGS. 1 to 5.

The print bed levelling system 1 as disclosed above allows for cost effective yet accurate levelling of the print bed member 4 and upper surface 4a thereof with respect to the one or more nozzle bodies 6, 7, in particular nozzle ends 8, 9 thereof. Here, print bed levelling may be construed as determining an actual orientation and position of the print bed member 4 and upper surface 4a with respect to each nozzle end 8,9 of one or more nozzle bodies 6, 7, wherein the print bed levelling system 1 itself may be subjected to manufacturing tolerances, dimensional drift due to temperature changes, humidity levels and/or contamination of various components.

The method of the present invention allows for accurate positioning of each nozzle end 8, 9 of the one or more nozzle bodies 6, 7 with respect to the upper surface 4a of the print bed member (4), wherein the method comprises the steps of
a) moving the print bed member 4 and the nozzle head assembly 2 toward one another from the distal sensing distance Sd to the proximal sensing distance Sp between the sensing surface 14 of the contactless sensor member 10 and the print bed member 4, e.g. the upper surface 4a thereof. In this method step one of the nozzle ends 8, 9 of the one or more nozzle bodies 6, 7 is closest to the print bed member 4, i.e. in the extended position relative to the sensing surface 14. The print bed levelling system 1 and the print bed member 1 is therefore being leveled for this nozzle end in question.

FIG. 2 can be viewed as a starting position of the nozzle head assembly 2 with respect to the print bed member 4 from which the present method may begin.

The method then comprises the step of
b) continuously measuring a change in displacement of the sensing surface 14 by the contactless sensor member 10 between the distal and proximal sensing distance Sd, Sp. In this step the nozzle head assembly 2 and print bed member 4 are steadily approaching whilst at the same time the contactless sensor member 10 continuously measures a relative change in displacement between the sensing surface 14 and the print bed member 4.

During continuous measurement by the contactless sensor member 10, the method proceeds with the step of
c) comparing the measured change in displacement to an expected change in displacement of the sensing surface 14. So while measuring the change in displacement, an expected change in displacement is determined and compared to the measured change in displacement by the contactless sensor member 10.

When comparing the measured and expected change in displacement, the method then comprises a conditional step of
d) halting movement between the print bed member 4 and the nozzle head assembly (2) upon detection of a difference between the measured change in displacement and the expected change in displacement, and assigning a zero level distance between the one of the nozzle ends 8,9 and the print bed member 4.

The above method allows accurate measurement of when a nozzle end of a nozzle body is contact engagement with the upper surface 4a of the print bed member 4, whereby a zero level distance can be assigned to that nozzle end with respect to the upper surface 4a. The measured proximal sensing distance Sp between the sensing surface 14 and the upper surface 4a of the print bed member 4 is then associated with the assigned zero level distance of that nozzle end.

When the method is performed by the print bed levelling system 1 of the present invention an actual location of a nozzle end relative to the print bed member 4 and upper surface 4a is determined. Manufacturing tolerances, dimensional perturbations and component misalignment as a result of e.g. temperature changes, humidly levels and/or contamination of the print bed member 4 are all accounted for.

An important advantage of the method is that only a relative sensing distance range between the distal sensing distance Sd and proximal sensing distance Sp is measured to automatically level or calibrate a position of the print bed member 4 with respect to one or more nozzle ends 8,9. A point at which a particular nozzle end is in contact engagement with the upper surface 4a of the print bed member 4 is sufficient to further derive other positions of that nozzle end with respect to the print bed member 4 as it moves relative thereto during an additive manufacturing process.

In an embodiment, the method step of d) may further comprise determining a zero level distance of the one of the nozzle ends 8,9 of the one or more nozzle bodies 6, 7 for two or more positions across the upper surface 4a of the print bed member 4. This embodiment allows for "surface mapping" of the print bed member 4 with respect to the one of the nozzle ends 8,9. For example, a substantially flat upper surface 4a of the print bed member 4 may in fact be lightly skewed at an angle or, generally, be misaligned with respect to the print bed levelling system 1 due to e.g. manufacturing tolerances, assembly errors but also due to wear of the print bed levelling system 1 over time. In order to account for such positional misalignments, determining a zero level distance of the one of the nozzle ends 8,9 at two or more locations across the print bed member 4 enables accurate positioning of said nozzle ends with respect to the upper surface 4a. For example, using e.g. three zero level distances across the print bed member 4 allows a plane to be determined accurately. Moreover, in an embodiment of the method it may even be possible to completely map 50% or more of the upper surface 4a. For example, by determining many zero level distances in a grid like fashion, a dense surface map may be obtained of a large number of points each of which is associated with a zero level distance as measured.

In an advantageous embodiment, the methods steps of a) to d) are performed one or more times for each nozzle end 8, 9 of the one or more nozzle bodies 6, 7. This embodiment ensures that all nozzle bodies 6, 7 and each nozzle end 8, 9 is assigned a zero level distance at one or more positions across the print bed member 4 and upper surface 4a thereof.

An important advantage of the method of the present invention is that it does not rely on whether the print bed member 4 and the nozzle head assembly 2 are both moving or just one of the two is moving. Only a relative change in displacement between the print bed member 4 and nozzle head assembly 2 is needed whilst performing the method. It is therefore possible to have an embodiment wherein the method step of a) moving the print bed member 4 and the nozzle head assembly 2 toward one another, comprises the step of moving the print bed member 4 toward the nozzle head assembly 2 whilst keeping the nozzle head assembly 2 stationary. Conversely, there is an embodiment wherein the method step of a) moving the print bed member 4 and the nozzle head assembly 2 toward one another, comprises the step of moving the nozzle head assembly 2 toward the print bed member 4 whilst keeping the print bed member 4 stationary.

To further clarify the method of the invention, FIGS. 4 and 5 depict different levelling configurations for determining a zero level distance between each of the two extrusions ends 8, 9 and the print bed member 4. For example, FIG. 4 depicts an embodiment wherein a first nozzle end 8 is in a retracted position with respect to the sensing surface 14 and wherein a second nozzle end 9 is in an extended position with respect to the sensing surface 14. The second nozzle end 9 is in contact engagement with the print bed member 4 and upper surface 4a thereof. The sensing surface 14 is at the proximal sensing distance Sp relative to the print bed member 4 and upper surface 4a thereof. In this levelling configuration and according to the method as outlined above, movement between the print bed member 4 and nozzle head assembly 2 is halted as a difference between a measured change in displacement and an expected change in displacement will be detected by the contactless sensor member 10. At that moment, according to the invention, it is now possible to assign a zero level distance to the second nozzle end 9 and determine the position of the print bed member 4 relative to the second nozzle end 9.

FIG. 5 depicts a further levelling configuration, wherein a first nozzle end 8 is in the extended position with respect to the sensing surface 14 and wherein the second nozzle end 9 is in the retracted position instead. In this case the first nozzle end 8 is in contact engagement with the print bed member 4 and upper surface 4a thereof. This time the sensing surface 14 is at the proximal sensing distance Sp relative to the print bed member 4 and upper surface 4a thereof and will now be associated with a zero level distance for the first nozzle end 8. The above mentioned method step d) is now performed by halting movement as a difference between the measured change in displacement and the expected in displacement will be detected, wherein a zero level distance can be assigned between the first nozzle end 8 and the print bed member 4 and upper surface 4a thereof.

While the invention has been described with reference to exemplary embodiments, it will be understood by those skilled in the art that various changes may be made and equivalents may be substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method of print bed levelling for a print bed levelling system, the print bed levelling system comprising a nozzle head assembly movably arranged with respect to a substantially flat print bed member, the nozzle head assembly comprising one or more nozzle bodies each having a nozzle end, and a contactless sensor member disposed at a print bed engagement end of the nozzle head assembly,
wherein the contactless sensor member comprises a sensing surface in sensing engagement with the print bed member over a relative sensing distance range between a distal sensing position and a proximal sensing position, and wherein the method comprises the steps of:
a) moving the print bed member and the nozzle head assembly toward one another from the distal sensing distance to the proximal sensing distance between the sensing surface of the contactless sensor member and the print bed member; wherein only one of the nozzle ends of the one or more nozzle bodies is in an extended position closest to the print bed member;
b) continuously measuring a change in displacement of the sensing surface by the contactless sensor member between the distal and proximal sensing distance;
c) determining an expected change in displacement of the sensing surface by determining whether a measured signal from the contactless sensor member exhibits an expected minimal signal changes as the print bed member and the nozzle head assembly move toward one another;
d) comparing the measured change in displacement to the expected change in displacement of the sensing surface; and
e) halting movement between the print bed member and the nozzle head assembly upon determination of a difference between the measured change in displacement and the expected change in displacement caused by the extended nozzle end being in contact engagement with an upper surface of the print bed member, and then assigning a zero level distance between the extended nozzle end and the print bed member.

2. The method of claim 1, wherein the method further comprises the step of determining a zero level distance of the extended nozzle end of the one or more nozzle bodies for two or more positions across an upper surface of the print bed member.

3. The method of claim 2, wherein determining the zero level distance of the extended nozzle end for two or more positions across an upper surface of the print bed member comprises
determining the zero level distance for the two or more positions in grid-like fashion along the upper surface of the print bed member.

4. The method of claim 1, wherein the methods steps of a) to d) are performed one or more times for each nozzle end of the one or more nozzle bodies.

5. The method of claim 1, wherein the method step of a) moving the print bed member and the nozzle head assembly toward one another, comprises the step of moving the print bed member toward the nozzle head assembly whilst keeping the nozzle head assembly stationary, or moving the nozzle head assembly toward the print bed member whilst keeping the print bed member stationary.

6. The method of claim 1, wherein method step b) comprises capacitively measuring a change in displacement of the sensing surface by the contactless sensor member between the distal and proximal sensing distance.

7. The method of claim 1, wherein method step b) comprises inductively measuring a change in displacement of the sensing surface by the contactless sensor member between the distal and proximal sensing distance.

8. The method of claim 1, wherein method step b) comprises acoustically measuring a change in displacement of the sensing surface by the contactless sensor member between the distal and proximal sensing distance.

9. The method of claim 1, wherein method step b) comprises optically measuring a change in displacement of the sensing surface by the contactless sensor member between the distal and proximal sensing distance.

10. A method of print bed levelling for a print bed levelling system, the print bed levelling system comprising a nozzle head assembly movably arranged with respect to a substantially flat print bed member, the nozzle head assembly comprising two or more nozzle bodies each having a nozzle end, and a contactless sensor member disposed at a print bed engagement end of the nozzle head assembly,
   wherein the contactless sensor member comprises a sensing surface in sensing engagement with the print bed member over a relative sensing distance range between a distal sensing position and a proximal sensing position, and wherein
   a primary nozzle of the two or more nozzle bodies is immovable with respect to the sensing surface and one or more secondary nozzles of the two or more nozzle bodies are movable with respect to the primary nozzle, the method comprising comprises the steps of
   a) moving the print bed member and the nozzle head assembly toward one another from the distal sensing distance to the proximal sensing distance between the sensing surface of the contactless sensor member and the print bed member; wherein only one of the nozzle ends of the two or more nozzle bodies is in an extended position closest to the print bed member;
   b) continuously measuring a change in displacement of the sensing surface by the contactless sensor member between the distal and proximal sensing distance,
   c) determining an expected change in displacement of the sensing surface by determining whether a measured signal from the contactless sensor member exhibits an expected minimal signal changes as the print bed member and the nozzle head assembly move toward one another;
   d) comparing the measured change in displacement to the expected change in displacement of the sensing surface; and
   e) halting movement between the print bed member and the nozzle head assembly upon determination of a difference between the measured change in displacement and the expected change in displacement caused by the extended nozzle end being in contact engagement with an upper surface of the print bed member, and then assigning a zero level distance between the extended nozzle end and the print bed member.

11. The method of claim 10, wherein the method further comprises the step of determining a zero level distance of the extended nozzle end of the two or more nozzle bodies for two or more positions across an upper surface of the print bed member.

12. The method of claim 11, wherein determining the zero level distance of the extended nozzle end for two or more positions across an upper surface of the print bed member comprises
   determining the zero level distance for the two or more positions in grid-like fashion along the upper surface of the print bed member.

13. The method of claim 10, wherein the methods steps of a) to d) are performed one or more times for each nozzle end of the two or more nozzle bodies.

14. The method of claim 10, wherein the method step of a) moving the print bed member and the nozzle head assembly toward one another, comprises the step of moving the print bed member toward the nozzle head assembly whilst keeping the nozzle head assembly stationary, or moving the nozzle head assembly toward the print bed member whilst keeping the print bed member stationary.

15. The method of claim 10, wherein method step b) comprises capacitively measuring a change in displacement of the sensing surface by the contactless sensor member between the distal and proximal sensing distance.

16. The method of claim 10, wherein method step b) comprises inductively measuring a change in displacement of the sensing surface by the contactless sensor member between the distal and proximal sensing distance.

17. The method of claim 10, wherein method step b) comprises acoustically measuring a change in displacement of the sensing surface by the contactless sensor member between the distal and proximal sensing distance.

* * * * *